June 4, 1935.  G. CARLSON ET AL  2,003,990

ELECTRIC CABLE

Filed Aug. 27, 1932

Inventors:
George Carlson,
Homer G. Knoderer,
by Charles E. Tullar
Their Attorney.

Patented June 4, 1935

2,003,990

UNITED STATES PATENT OFFICE 2,003,990

ELECTRIC CABLE

George Carlson, Bridgeport, and Homer G. Knoderer, Fairfield, Conn., assignors to General Electric Company, a corporation of New York Application August 27, 1932, Serial No. 630,712

3 Claims. (Cl. 173—267)

Our invention relates to electric cable and more particularly to electric cable of the armored type.

Buildings are generally wired with an electric cable consisting of two or more electrical conductors separately covered by insulation and grouped together and provided with an over-all insulating covering, surrounded by a metallic armor. This metallic armor provides a mechanical protection for the conductors and insulation. This metallic armor is generally electrically connected to the grounded side of the circuit to prevent it from being charged to the potential of the ungrounded side of the circuit. Due to defective material or improper handling of the material, it frequently happens that one of the ungrounded conductors will be in electrical contact with the metallic armor. This produces a short circuit from the ungrounded side, through the conductor in contact with the metallic armor, then through the metallic armor to the grounded side of the circuit. The metallic armor is generally formed of a metal with a low conductivity and in addition if the electrical current follows the metallic strip instead of travelling longitudinally of the cable it will have a relatively long path. Due to the high resistance of the metallic armor the short circuit current will be relatively small and in general will not be sufficient to cause the blowing of the fuse protecting the circuit. Though this short circuit current load may be small from the point of view of the electrical consumer it may be relatively large over a long period of time. A more serious effect of this short circuit current may be the generation of heat in the metallic armor at a point where it is in physical contact with the wooden frame work of the building. The heat generated by the short circuit may start a fire which may not be discovered until it is too late to prevent considerable damage being done to the building.

The object of our invention is to provide an improved armored cable which will be free from the hazards found in the present type of armored cable in general use. A further object of our invention is to provide an improved armored cable of low cost of manufacture. A further object of our invention is to provide an improved armored cable which will have a smaller outside diameter for the same current carrying capacity.

What we consider to be novel and our invention will be better understood by reference to the accompanying drawing when considered in connection with the following description.

Figure 1:
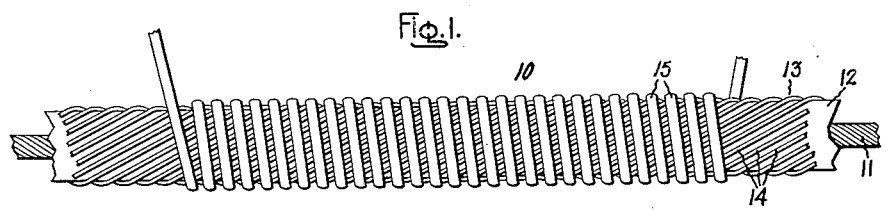
Figure 2:
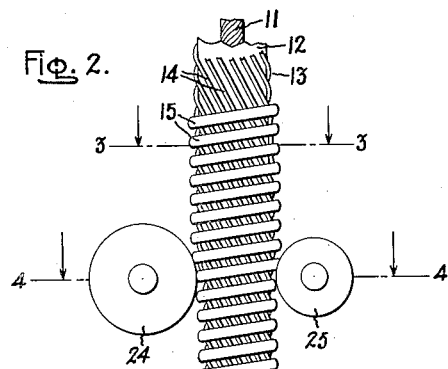
Figure 3:
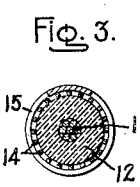
Figure 4:
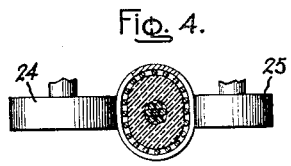
Figure 5:
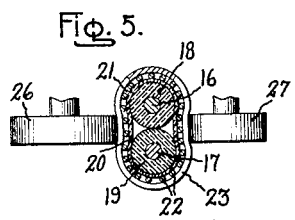
Figure 6:
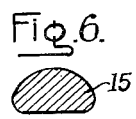

In the drawing, Figure 1 is a plan view of a two conductor cable with the armor, conductors and insulation broken away to illustrate the construction, Fig. 2 is a similar view to Fig. 1 with rolls shown for deforming the armor as the cable moves between them, Figure 3 is a cross sectional view of the cable on line 3—3 of Figure 2, Figure 4 is a cross sectional view on line 4—4 of Fig. 2, Fig. 5 is a cross sectional view similar to Figure 4 of a three conductor cable, and Fig. 6 is a cross sectional view of the armor strip.

Referring to the drawing, Figs. 1 and 2, a two conductor cable (10) is shown having a conductor (11) covered by the usual insulation (12). Surrounding the conductor (11) and insulation (12) is a second conductor (13) consisting of a number of strands (14) distributed uniformly around the circumference of insulation (12). The strands (14) are wound spirally around the insulation (12) with a long pitch spiral. The spiral wrapping of strands (14) is necessary to prevent the breaking of the strands by the flexing of the conductors or cable. Obviously if the strands (14) were laid longitudinally over the insulation (12), when the cable was flexed the strands on the outer portion of the cable would be severed. The spiral wrapping of the strands (14) permits them to unwind sufficiently to prevent an undue tension on the bending of the cable. Long spirals are used to reduce the length of the strands necessary and to keep the resistance of conductor (13) relatively low per unit length of cable. Conductor (13) is uninsulated. Surrounding conductor 13 is a metal armor 15 consisting of a strip of metal of half-round shape, as shown in Fig. 6, wound in a spiral form with the flat side in contact with conductor 13. Armor 15 is wound in the opposite direction from the direction in which the strands 14 are wound around the insulation 12. This facilitates the unwinding of armor 15 and prevents the simultaneous unwinding of strands 14. Armor 15 is wound with a short pitch spiral. The adjacent spirals of armor 15 are spaced longitudinally to permit the flexing of the cable without engagement between the adjacent spirals on the under side of the bend which would tend to force one of the spirals in toward the center of the cable thus severing some of the strands 14. In order to permit easy stripping of the armor and to prevent the edge of the metal strip cutting the strands as it is wound under tension over them the armor 15 may not be very tightly wound over the conductor 13. Loose fitting of armor 15 over the conductor 13 introduces the difficulty of preventing the armor from unwinding at the free end of the cable. To prevent this unwinding at the free end, armor 15 is deformed transversely. As best indicated in Figures 2 and 4 this transverse deformation is accomplished by flattening the armor and cable by rolls 24 and 25 on opposite sides of the transverse section. This deformation relieves the spring tension tending to cause the armor to unwind when it is released at one end. Obviously, this deformation to prevent the unwinding of the armor 15 at the free ends of the cable can be accomplished in other ways than that illustrated, such as by the flattening of a transverse section on one side only. In Fig. 3 the cable is shown before armor 15 is deformed and in Fig. 4 it is shown after the armor 15 is deformed.

In Figure 5 a three conductor cable is illustrated embodying our improved construction. Two conductors 16 and 17 are provided with separate covers of insulating material 18 and 19 respectively. Conductors 16 and 17 are provided with an over-all covering of insulating material 20. Surrounding this over-all covering 20 is a third conductor 21 consisting of strands 22 evenly distributed over the circumference of over-all covering 20. Strands 22 are wound with a long pitch spiral over the covering 20 in a similar manner as described in connection with Figure 1. An armor 23 is provided surrounding and in direct contact with conductor 21. The transverse section of armor 23 is deformed in a manner similar to that described in connection with Figure 2 by rolls 26 and 27. This deformation is indicated in Figure 5 in which it may be seen that the transverse section of armor 23 deviates from the normal oval shape of the over-all covering 20 and conductor 21 at opposite sides at which points it is somewhat flattened.

The provision of the armor 15 and 23 in direct electrical contact with the uninsulated conductors 13 and 21 eliminates the necessity of grounding the armor when the cable is used in a grounded circuit since the bare conductors are adapted to be connected to the grounded side of the circuit and thus provide a continuous ground for the armor. Thus any short-circuit between an ungrounded conductor and the armor insures a path of low resistance for a short-circuit current which will cause the immediate blowing of the protective fuse on the occurrence of the short-circuit. This, in consequence, considerably reduces the fire hazard upon the occurrence of short-circuit. In addition the elimination of the necessity of an insulating covering for one of the conductors of the cable reduces the amount of material necessary in the manufacture of that cable, thus reducing its manufacturing cost. Also the elimination of the insulating covering for one of the conductors reduces the over-all diameter of the cable.

What we claim as new and desire to secure by Letters Patent of the United States, is:

1. In combination in a cable, a plurality of conductors, separate coverings of insulating material for each conductor, an overall covering of insulating material for said conductors, a stranded conductor wound spirally with a long pitch spiral about said conductors and overall covering of insulating material, and a metal armor wound in the opposite direction from said stranded conductor with a short pitch spiral with spaced convolutions directly in contact with said stranded conductor.

2. In combination in a cable, a plurality of conductors, separate coverings of insulating material for each conductor, an overall covering of insulating material for said conductors, a stranded conductor wound spirally with a long pitch spiral about said conductors and overall covering of insulating material, and a metal armor wound with a short pitch spiral with spaced convolutions directly in contact with said stranded conductor, said metal armor being deformed after its application by flattening opposite sides of the cable.

3. An electric cable comprising a conductor, a cover of insulating material for said conductor, a second conductor consisting of a plurality of separate strands wound spirally with a long pitch spiral about said first named conductor and spaced around the circumference of said covering, and a metal armor wound directly over and in contact with said strands, said armor being wound with a short pitch spiral with spaced convolutions.

GEORGE CARLSON.
HOMER G. KNODERER.